April 13, 1954    F. W. BAUER    2,675,039
PEACH AND APRICOT PITTING MACHINE
Filed May 22, 1951    3 Sheets-Sheet 1
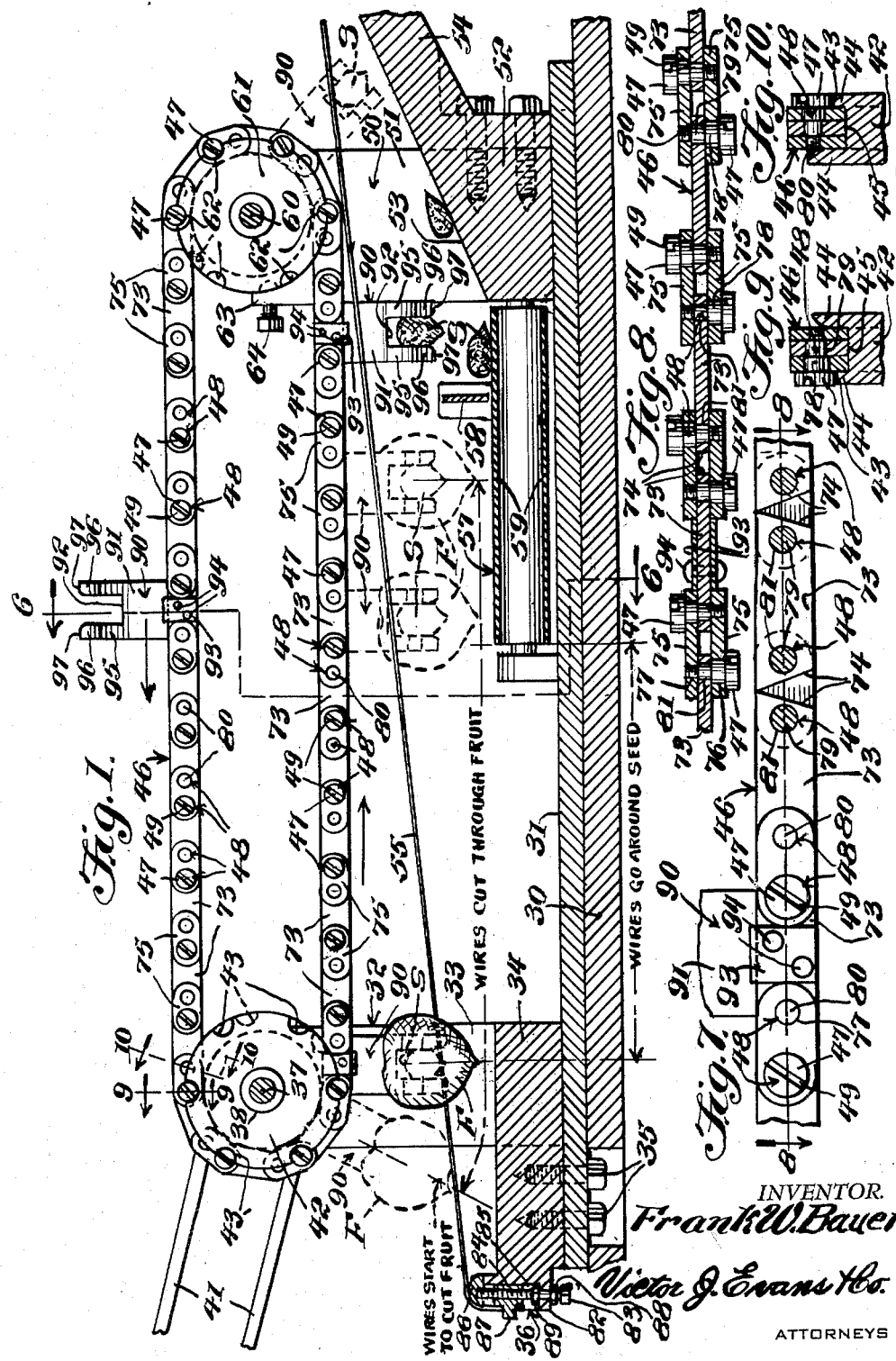
INVENTOR.
Frank W. Bauer,
Victor J. Evans Co.
ATTORNEYS April 13, 1954   F. W. BAUER   2,675,039
PEACH AND APRICOT PITTING MACHINE
Filed May 22, 1951   3 Sheets-Sheet 2
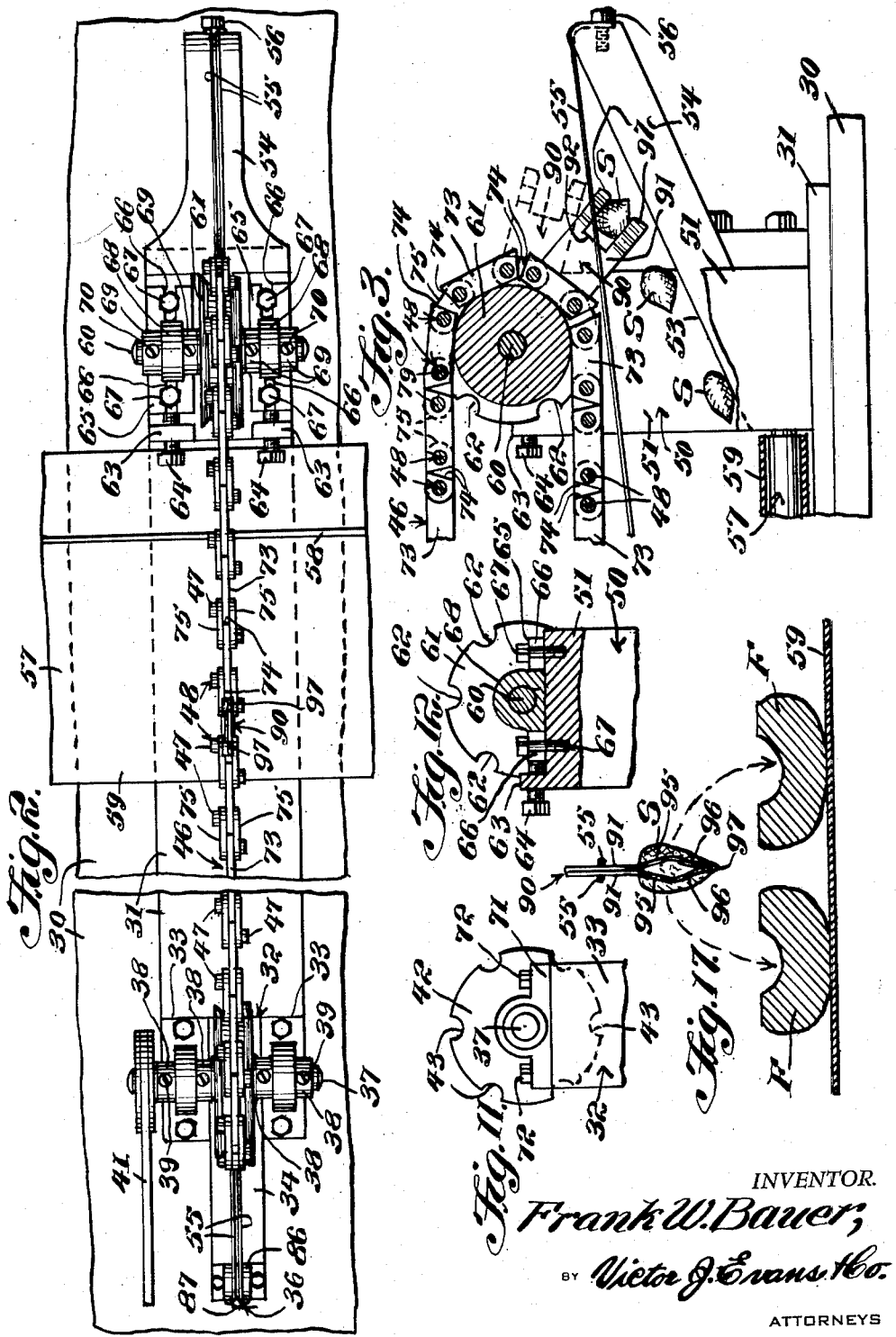
INVENTOR.
Frank W. Bauer;
BY Victor J. Evans & Co.
ATTORNEYS April 13, 1954  F. W. BAUER  2,675,039
PEACH AND APRICOT PITTING MACHINE
Filed May 22, 1951  3 Sheets-Sheet 3
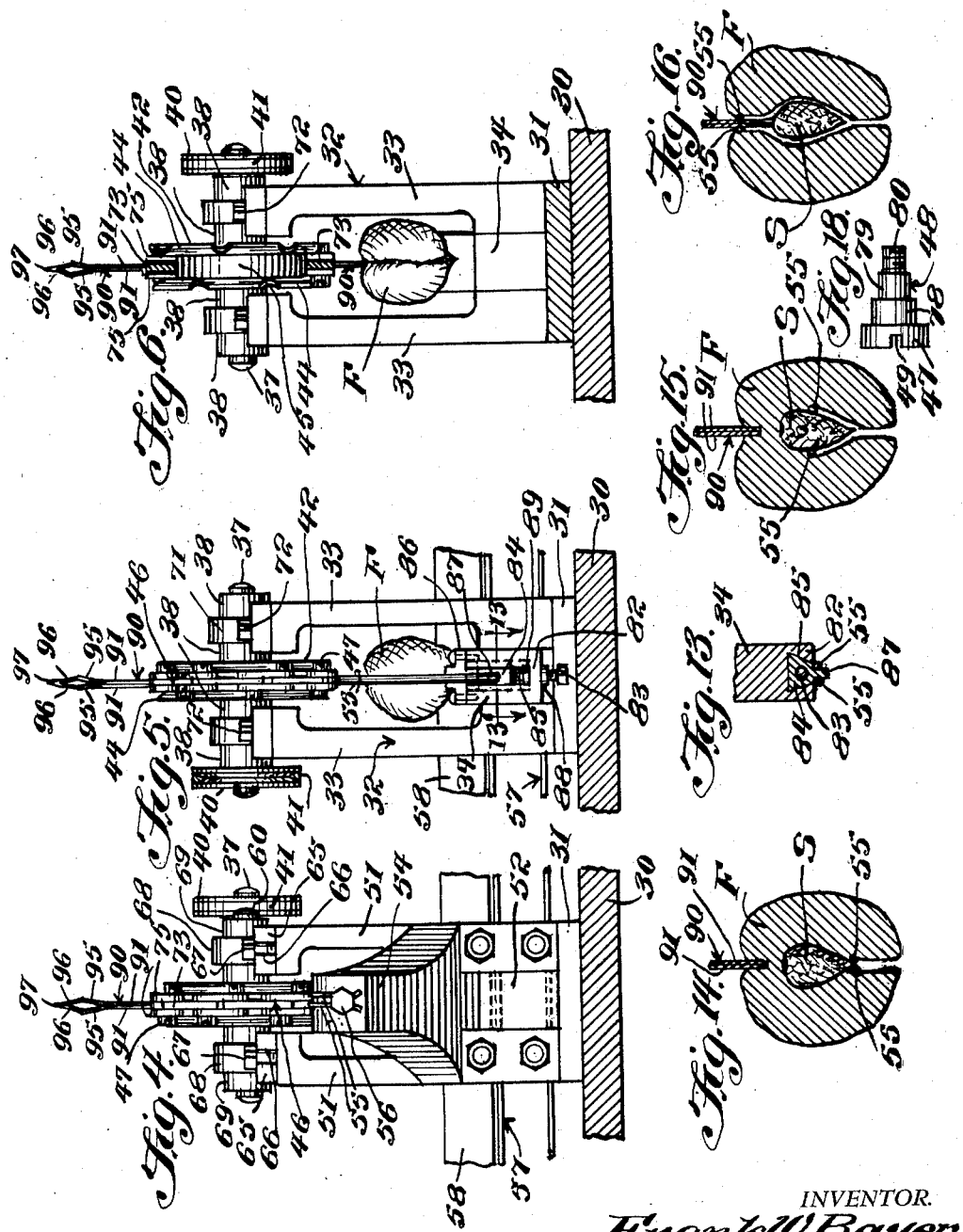
INVENTOR.
Frank W. Bauer,
BY Victor J. Evans & Co.
ATTORNEYS Patented Apr. 13, 1954

2,675,039

UNITED STATES PATENT OFFICE 2,675,039

PEACH AND APRICOT PITTING MACHINE

Frank W. Bauer, Dundee, Ill.

Application May 22, 1951, Serial No. 227,607

1 Claim. (Cl. 146—17)

This invention relates to a method of and apparatus for slicing and removing seeds from fresh fruit, such as apricots or peaches.

The object of the invention is to provide a method of and apparatus for automatically slicing fruit, such as peaches or apricots, the machine of the present invention including a novel means for removing the seeds from the fruit.

Another object of the invention is to provide a method of and apparatus for slicing in two fresh fruits, the fruit being loaded on the machine by hand when it is time, there being an endless chain having a plurality of spaced fruit-holding carrier members mounted on the chain, whereby the fruit will be carried into engagement with the wires which slice the fruit in two and later remove the seeds from the fruit.

A further object of the invention is to provide a fruit-slicing and deseeding machine and method for operating same, wherein the sliced fruit is deposited on a conveyor, whereby the fruit can be carried to any desired location, the seeds that are removed from the fruit also being deposited on the conveyor, but maintained separated from the sliced fruit.

Still a further object of the invention is to provide a method of and apparatus for deseeding and slicing fruit, wherein the fruit is carried into engagement with a cutting wire by means of moving carrier members, there being a novel means provided for adjusting the tension of the chain-carrying members and the wire.

Yet another object of the invention is to provide a fruit-deseeding and slicing machine which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view of the fruit-slicing and deseeding machine of the present invention, with parts broken away and in section;

Figure 2 is a top plan view of the machine of the present invention;

Figure 3 is a fragmentary side elevational view of the idler or driven sprocket, and with parts broken away and in section;

Figure 4 is a rear end elevational view of the machine;

Figure 5 is a front end elevational view of the machine of the present invention;

Figure 6 is a sectional view taken on the line 6—6 of Figure 1;

Figure 7 is a fragmentary side elevational view showing a portion of the endless chain;

Figure 8 is a sectional view taken on the line 8—8 of Figure 7;

Figure 9 is a sectional view taken on the line 9—9 of Figure 1;

Figure 10 is a sectional view taken on the line 10—10 of Figure 1;

Figure 11 is a fragmentary side elevational view showing the drive sprocket;

Figure 12 is a fragmentary side elevational view of the driven sprocket, with parts broken away and in section;

Figure 13 is a fragmentary sectional view showing a portion of the wire-tensioning mechanism; taken on line 13—13 of Fig. 5;

Figures 14, 15 and 16 are sectional views taken through a piece of fruit and showing the various depths wherein the wire cuts or slices the fruit in two;

Figure 17 is a view showing the fruit sliced in two and received on the conveyor.

Figure 18 is a detail view of the bolts that hold the endless chain links together.

Referring in detail to the drawings, the numeral 30 designates a portion of a table, Figure 1, and supported on the table 30 is a horizontally disposed base 31. A first bracket 32 extends upwardly from the base 31 and is secured thereto, and the bracket 32 includes a pair of spaced, parallel, vertically disposed legs 33. A block 34 is disposed between the pair of legs 32, and the block 34 is secured to the base 31 by suitable securing elements, such as bolts or screws 35. A wire tensioning mechanism 36 is mounted on the outer end of the block 34 for a purpose to be later described.

Supported by the upper ends of the legs 33 is a horizontally disposed drive shaft 37. A plurality of collars 38 are maintained on the drive shaft 37 by suitable set screws 39, and a pulley 40 is mounted on one end of the drive shaft 37, Figure 2. An endless belt 41 is trained over the pulley 40 and the endless belt 41 may be driven by any suitable motor, whereby the shaft 37 will be rotated. Arranged intermediate the ends of the drive shaft 37 and secured thereto is a sprocket 42. The sprocket 42 is provided with a plurality of spaced recesses or sockets 43 for a purpose to be later described. The sockets 43 are arranged on each side of the sprocket 42, as shown best in Figures 9 and 10 of the drawings. In other words, the sprocket 42 is provided with annular flanges 44, Figures 9 and 10, and each of the flanges 44 has a plurality of recesses or sockets 43 therein. These flanges 44 coact to define a space 45 therebetween for receiving therein a portion of an endless chain 46. The construction of the chain 46 will be described later in this application, but the chain 46 includes a plurality of bolts 48 for connecting links together. Each of the bolts 48 has a head 47 thereon which is adapted to seat in one of the sockets 43. A suitable kerf or slit 49 is arranged in each head 47 of each of the bolts 48, whereby a suitable tool, such as a screw driver, can be arranged in engagement with the kerf 49 for removing or replacing a bolt.

Arranged in spaced relation with respect to the first bracket 32 is a second bracket 50, Figure 1. The bracket 50 includes a pair of spaced, parallel, vertically disposed legs 51 that extend upwardly from the base 31 and are secured thereto, and interposed between the pair of legs 51 is a body member 52. The upper surface of the body member 52 is inclined, as at 53, whereby seeds S that have been ejected or removed from the fruit F will slide down the inclined surface 53 onto a moving conveyor 57, Figure 1. Arranged above the conveyor 57 is a stationary partition 58, whereby the seeds which are guided onto the conveyor 57 by the inclined surface 53 will be maintained separated from the sliced fruit F which is also received or deposited on the conveyor 57. The conveyor 57 includes an endless belt 59 which runs transversely below the chain 46, and the endless conveyor 57 can be used for transferring the seeds and sliced fruit to any desired location.

Extending upwardly from the body member 52 is a tongue 54, and a bolt or screw 56 extends into the outer free end of the tongue 54. A wire 55 is trained over the bolt 56, and the wire 55 extends to the wire tensioning mechanism 36. It will be seen from the drawings that the wire 55 constitutes or includes a pair of strands which are arranged contiguous to each other, and the strands of wire 55 constitute a cutting and deseeding element as later described in this application.

Supported by the upper end of the bracket 50 is a horizontally disposed driven shaft 60. A vertically disposed idler sprocket or driven sprocket 61 is mounted on the shaft 60, and the sprocket 61 is provided with a plurality of spaced recesses or sockets 62 for receiving therein the heads 47 of the bolts 48. Formed integrally with the upper end of each of the legs 51 is a lip 63, Figure 12, and a headed bolt 64 extends through each of the lips 63. A plate 65 is slidably arranged on the upper surface of each of the legs 51, Figures 2, 5 and 12, and each of the plates 65 is provided with a pair of aligned slots 66. Bolts or screws 67 extend through the slots 66 and into engagement with the legs 51, the bolts 67 serving as guides so as to insure that the plates 65 move in a straight path. Due to the fact that the bolts 67 extend through the slots 66, the plates 65 will be permitted to slide back and forth across the tops of the legs 51 and this construction permits the shaft 60 to be shifted so that the tension on the chain 46 can be adjusted as desired. Formed integrally with each of the plates 65 is a bearing 68, and the bearing 68 rotatably receives therein the shaft 60. Thus, by turning the bolts 64 in the lip 63, the inner ends of the bolts 64 will engage the adjacent ends of the plates 65, to thereby cause the plates 65 to slide along the legs 51, whereby the shaft 60 can be moved away from the drive shaft 37. This will insure that the chain 46 is at all times maintained under proper tension. Collars 69 are mounted on the driven shaft 60, and the collars 69 are connected to the driven shaft by suitable set screws 70, Figure 2.

The previously described drive shaft 37 is rotatably supported by a pair of bearing blocks 71, Figure 11, and the bearing blocks or plates 71 are secured to the upper ends of the legs 33 by suitable bolts or screws 72. It is to be noted that the drive shaft 37 is stationary, while the driven shaft 60 can be moved, whereby the tension of the chain 46 can be properly adjusted. Also, it is to be noted that there are two of the previously-described plates 65, and consequently two of the bolts 64.

The construction of the endless chain 46 is as follows: The chain 46 includes a plurality of bars 73 which are each provided with an angular or inclined face 74, Figure 7, whereby the chain 46 will be able to turn or pivot about the sprockets. The bars 73 are pivotally connected together, and arranged on each side of the bars 73 is a plurality of links 75 which are interconnected, Figures 7 through 10. Each of the links 75 is provided with an opening 76, and a threaded aperture 77. Further, each of the bars 73 is provided with a pair of spaced holes 81. Each of the bolts 48 includes the previously-described head 47, and arranged contiguous to the head 47 is a cylindrical portion 78. Arranged adjacent the portion 78 is a cylindrical portion 79 which is of less diameter than the portion 78. Extending from the portion 79 is a threaded shank or stem 80 which is of less diameter than the portion 79. When the parts are assembled, the threaded shank 80 projects into threaded engagement with the threaded apertures 77 in the links 75, while the portion 79 rotatably extends through one of the holes 81 in the bars 73. Then, the other portion 78 of the bolt 48 is rotatably seated in the opening 76 in the link 75. Thus, the bolts 48 effect a pivotal connection between the links 75 and bars 73.

The mechanism 36 is provided for adjusting or maintaining the wire 55 under proper tension. The mechanism 36 includes a horizontally disposed shelf 82 that is formed integrally with or secured to the block 34, Figure 1. Extending through the shelf 82 is a headed bolt 83, and the bolt 83 is arranged in engagement with a wedge 84 that is slidably arranged in a dovetail groove 85, Figure 13. A cap 86 is mounted on the upper end of the bolt 83, Figure 5, and extending from the wedge 84 is a lug 87, a portion of the wire 55 being arranged in engagement with the lug 87. Shoulders 88 and 89 are arranged on opposite sides of the shelf 82. Thus, by rotating the bolt 83, the wedge 84 can be slid or moved up and down in the dovetail groove 85, whereby the lug 87 will cause the wire 55 to be adjusted to the desired tension.

Connected to the chain 46 is a plurality of fruit-carrying elements or members 90, Figure 1. Each of the fruit-carrying elements 90 includes a pair of spaced side members 91 which are provided with a rectangular cutout or recess 92 for receiving therein the peach, apricot or other piece of fruit which is to be sliced and deseeded. The elements 90 are connected to the endless chain 46 by means of fingers 93 which extend from the side members 91, the fingers 93 being secured to the bars 73 by suitable securing elements, such as rivets 94. Each of the side members 91 has its outer end shaped to define an outwardly extending section 95 and an inwardly extending section 96, Figures 4, 5 and 6, and the outer ends of the side members 91 merge together or are connected together so as to provide a pointed end 97.

In use, apricots, peaches or other fruit, indicated by the letter F, are manually loaded onto the carrier elements 90, the fruit being loaded on the carrier elements 90 when the carrier elements are in their uppermost positions, as shown in Figure 1. The fruit is arranged so that it projects into the cutouts 92, with the crease lines of the fruit being arranged in alignment with the pointed ends 97 of the elements 90. Sufficient pressure is applied to the fruit until the seeds S of the fruit contact the elements 90. Meanwhile, the endless chain 46 is being rotated by each of the belts 41, so that the elements 90 loaded with fruit will travel in a counterclockwise direction from the raised position shown in solid lines in Figure 1 to the position shown in dotted lines in Figure 1. This will cause the fruit to be brought into engagement with the cutting wires 55 so that the fruit will be cut in two. The steps by which the wires 55 cut the fruit are shown in Figures 14 through 16, so that initially the wires 55 cut into the fruit a portion of the way. Then, the wires continue cutting into the fruit until the wires engage the seeds S, and the wires 55 are then spread apart and pass over the exterior of the seeds S to the position shown in Figure 15. Next, the wires 55 follow the contour of the seed S and continue cutting the fruit in two and assume the position shown in Figure 16 during continued movement of the carrier elements 90. It is to be noted that the wires 15 are inclined so that the aforementioned cutting action takes place.

Meanwhile, the sliced fruit will be discharged from the carrier elements 90 onto the conveyor 57, due to the fact that the wires 55 being above the sliced fruit will cause the fruit to be ejected or discharged from the carrier elements 90 upon continued counterclockwise movement of the chain 46. Next, the carrier elements 90 continue to carry the seeds S along and as the carrier elements 90 pass around the idler sprocket 61, it will be seen that the seeds S will be brought into engagement with the lower surface of the wires 55, and this will cause the seeds to be ejected or discharged from the carrier elements 90 onto the body member 52. The seeds S will then slide down the inclined surface 53 onto the conveyor 57. The stationary partition 58 will maintain the seeds S separated from the sliced fruit F on the conveyor 57, and the conveyor 57 will carry the sliced fruit and seeds to any desired bins, receptacles or other locations. The tension of the chain 46 can be adjusted by means of the bolts 64 and the tension of the wires 55 can be properly adjusted by means of the mechanism 36.

The conveyor 57 can be used for transferring fruit to a washing machine where the fruit that has been sliced can be washed or the conveyor 57 can be used for transferring the fruit to a place where the fruit is to be chemically treated. The machine of the present invention will enable fruit, such as peaches or apricots to be pitted quickly and inexpensively. The chain 46 is constructed so that the parts will not bind during the movement of the chain, and the sprockets have recesses or sockets therein for receiving the heads 47 of the bolts 48. When the wires 55 are to be tightened or loosened, the bolt 83 is rotated so that the wedge 84 will move up or down in the dovetail groove 85.

When the peach or apricot is inserted into the element 90, the crease of the peach or apricot is arranged in alignment with the pointed ends 97. When the fruit is inserted in the element 90, the fruit is arranged so that the wide part of the seed S is down and the narrow part of the seed is up, Figure 1, and the edges of the seed are received in the openings formed between the portions 95 and 96.

As soon as the element 90 reaches the position shown in dotted lines in the left hand side of Figure 1, the wires 55 will start cutting the fruit F, and the pointed ends 97 of the elements 90 will start to expand the wires 55. The configuration or flared shape of the seeds S will continue to expand the wires 55, and the wires will follow the exterior configuration of the seeds S. Later the seed S is ejected onto the inclined surface. The wires 55 continue and finally cut the peach or apricot in half, as shown in Figure 16, and continued movement of the elements 90 causes the wires 55 to eject the halves of fruit onto the conveyor 57. Later, the seeds S are ejected onto the inclined surface 53 and guided onto the conveyor 57 also.

What is claimed is:

In a machine for slicing fruit and removing the seeds therefrom, a block, a horizontally disposed drive shaft supported above said block, a first sprocket mounted on said drive shaft and including a plurality of sockets, a body member spaced from said block and including an inclined surface for guiding ejected seeds therealong, a conveyor for receiving seeds from said body member, a partition for maintaining the seeds on one side of the conveyor, a driven shaft spaced from said drive shaft, a second sprocket positioned above said body member mounted on said driven shaft and provided with a plurality of spaced sockets, an endless chain trained over said first and second sprockets and including a plurality of links, bolts having heads thereon for seating in the sockets in said sprockets pivotally connecting said links together, a plurality of fruit-carrying elements secured to said chain, each of said fruit carrying elements comprising a pair of side members having a cutout for receiving fruit seed therein, a tongue projecting upwardly from said body member, and an inclined wire including a pair of contiguous strands below said chain and extending upwardly between said block and said tongue, said strands being positioned below the path of said fruit carrying elements at the block end of the conveyor and positioned above the cutout portion of said fruit carrying elements at the body end and substantially adjacent the conveyor so that said strands of wire pass along both sides of the fruit seed to sever the flesh therefrom.

References Cited in the file of this patent

UNITED STATES PATENTS

| Number | Name | Date |
|---|---|---|
| 484,995 | Burns | Oct. 25, 1892 |
| 1,407,524 | Fourchy | Feb. 21, 1922 |
| 1,617,909 | Jepson | Feb. 15, 1927 |
| 1,754,636 | McCollom | Apr. 15, 1930 |